United States Patent
Maeno

(10) Patent No.: US 7,618,051 B2
(45) Date of Patent: Nov. 17, 2009

(54) SHOCK ABSORBER SPRING SEAT

(75) Inventor: Koji Maeno, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/908,024

(22) PCT Filed: Jul. 5, 2006

(86) PCT No.: PCT/IB2006/001851

§ 371 (c)(1),
(2), (4) Date: Sep. 7, 2007

(87) PCT Pub. No.: WO2007/004043

PCT Pub. Date: Jan. 11, 2007

(65) Prior Publication Data

US 2008/0203692 A1    Aug. 28, 2008

(30) Foreign Application Priority Data

Jul. 5, 2005   (JP)   ............................. 2005-196488
Jul. 3, 2006   (JP)   ............................. 2006-183709

(51) Int. Cl.
  *B60G 15/06*   (2006.01)
  *B60K 15/01*   (2006.01)
(52) U.S. Cl. ............................. 280/124.154; 280/124.1; 280/834; 180/274
(58) Field of Classification Search ............... 280/124.1, 280/124.141, 124.142, 124.145, 124.146, 280/124.147, 124.151, 124.154, 124.155, 280/124.179, 834; 180/271, 274, 284
See application file for complete search history.

(56) References Cited

U.S. PATENT DOCUMENTS

| 4,746,146 | A  |   | 5/1988  | Hirabayashi et al. |
| 4,771,996 | A  | * | 9/1988  | Martinez et al. ............ 267/220 |
| 4,787,643 | A  | * | 11/1988 | Shirata ....................... 280/834 |
| 5,342,029 | A  | * | 8/1994  | Carter ......................... 267/220 |
| 6,199,845 | B1 | * | 3/2001  | Rispeter et al. ............. 267/221 |
| 7,090,058 | B2 | * | 8/2006  | Miyazaki et al. ....... 188/322.12 |
| 7,422,242 | B2 | * | 9/2008  | Matsumoto et al. ......... 280/834 |

(Continued)

FOREIGN PATENT DOCUMENTS

CN    1576638    2/2005

(Continued)

OTHER PUBLICATIONS

Definition of Along, Merriam-Webster's Online Dictionary, available at http://www.merriam-webster.com/dictionary/along (last visited on Sep. 28, 2008).*

*Primary Examiner*—Paul N. Dickson
*Assistant Examiner*—George D. Spisich
(74) *Attorney, Agent, or Firm*—Oblon, Spivak, McClelland, Maier & Neustadt, L.L.P.

(57) ABSTRACT

A spring seat of a shock absorber includes a disc-shaped seat portion to which one end of a coil spring is fixed and a slide portion formed protruding in the radial direction from the seat portion. A fuel inlet pipe is configured to slide along the slide portion toward a side surface of the spring seat, thus enabling interference between the fuel inlet pipe and the shock absorber to be relieved at a low cost.

7 Claims, 5 Drawing Sheets

U.S. PATENT DOCUMENTS

2003/0218286 A1* 11/2003 Miyazaki et al. ............ 267/220
2005/0012292 A1* 1/2005 Kuki et al. ............ 280/124.155

FOREIGN PATENT DOCUMENTS

| | | |
|---|---|---|
| JP | 62 131809 | 6/1987 |
| JP | 64-22628 | 2/1989 |
| JP | 4-310430 | 11/1992 |
| JP | 6-286445 | 10/1994 |
| JP | 2001 1729 | 1/2001 |
| JP | 2001-234967 A | 8/2001 |
| JP | 2002 205665 | 7/2002 |
| JP | 2003-137140 | 5/2003 |
| JP | 2005 247507 | 9/2005 |
| JP | 2006-123634 A | 5/2006 |
| WO | 00 56560 | 9/2000 |
| WO | WO 2005/005190 * | 6/2005 |

* cited by examiner

SHOCK ABSORBER SPRING SEAT

BACKGROUND OF THE INVENTION

1. Field of the Invention

The invention relates to a spring seat used in a shock absorber.

2. Description of the Related Art

A vehicle is usually provided with a fuel inlet pipe for introducing fuel filled from a fuel filler hole to a fuel tank. Shock absorbers are also mounted in a vehicle to improve the ride as well as stability and controllability by reducing vibrations and impact when the vehicle is running. Each shock absorber includes a coil spring, one end of which is fixed to a spring seat. The spring seat is formed in a disc shape having a larger diameter than the coil spring.

One example of known technology related to this structure is a rear suspension member support structure in which a fuel tube is arranged in a space surrounded by the rear suspension member, the spare tire house, and a rigid member in order to reduce the danger of interference between the spare tire house and the fuel tube during a rear collision (see Japanese Patent Application Publication JP-A-62-131809, for example). In addition, a wheel house portion structure is also known which provides a bead between an overhang portion of a rear side member and a fixed strong portion. This bead absorbs impact force during a rear collision, thus protecting the fuel tube (see Japanese Patent Application Publication JP-A-2002-205665, for example). In both of these structures, the fuel tube and the shock absorber are arranged in close proximity to one another at a rear portion of the vehicle.

Furthermore, technology is known in which a plurality of flange portions which correspond to the outer dimension of a large diameter coil portion are provided on a spring seat of a shock absorber (see Japanese Patent Application Publication JP-A-2001-1729, for example). If the large diameter coil portion of the shock absorber breaks, the spring seat can prevent the broken large diameter coil portion from dropping downwards.

As described above, there are cases in which the fuel inlet pipe and the shock absorber are arranged in close proximity to one another in the rear portion of a vehicle. In such cases, if the vehicle is hit from behind, there may be interference between the fuel inlet pipe and the spring seat. Although the effect on durability and the like due to that interference can be reduced if a highly durable fuel inlet pipe is used, such a fuel inlet pipe is more expensive and thus increase costs.

SUMMARY OF THE INVENTION

It is therefore an object of this invention to provide a shock absorber spring seat which, at a low cost, is able to relieve interference between the spring seat and the fuel inlet pipe during a collision in which the vehicle is hit from the behind.

In order to solve the foregoing problem, a shock absorber spring seat according to one aspect of the invention is provided with a disc-shaped seat portion to which one end of a coil spring is fixed, and a slide portion formed protruding in a radial direction from the spring seat.

According to this aspect, even if the fuel inlet pipe contacts the spring seat, the fuel inlet pipe is able to slide on the side surface of the spring seat along the slide portion. As a result, interference between the fuel inlet pipe and the shock absorber can be relieved by a simple structure in which a slide portion is provided, and thus that interference is able to be relieved at a low cost.

The slide portion may also include a flat curved tip end surface and a slide surface formed on both sides of the tip end surface. With this structure, even if the fuel inlet pipe comes into contact with the spring seat during a collision, regardless of the direction from which the fuel inlet pipe approaches the tip end surface, the tip end surface which is formed in a flat curved surface shape guides the fuel inlet pipe to one of the slide surfaces formed on the sides. Thus, because the fuel inlet pipe that was guided to the slide surface is able to slide along that slide surface, interference between the fuel inlet pipe and the spring seat is able to be relieved. Accordingly, structuring the slide portion to include the flat curved tip end surface and the slide surfaces formed on both sides of that tip end surface enables interference between the fuel inlet pipe and the shock absorber to be relieved to an even greater extent.

The slide surface may also be a flat surface which connects a side surface of the seat portion with the tip end surface. This structure-enables the fuel inlet pipe to slide smoothly from the tip end portion side to the seat portion side.

The invention enables interference that occurs between a spring seat and a fuel inlet pipe during a collision to be relieved at a low cost. dr

BRIEF DESCRIPTION OF THE DRAWINGS

The above mentioned and other features, advantages, technical and industrial significance of this invention will be better understood by reading the following detailed description of exemplary embodiments of the invention, when considered in connection with the accompanying drawings, in which.

DETAILED DESCRIPTION OF THE EXAMPLE EMBODIMENTS

Figure 1:
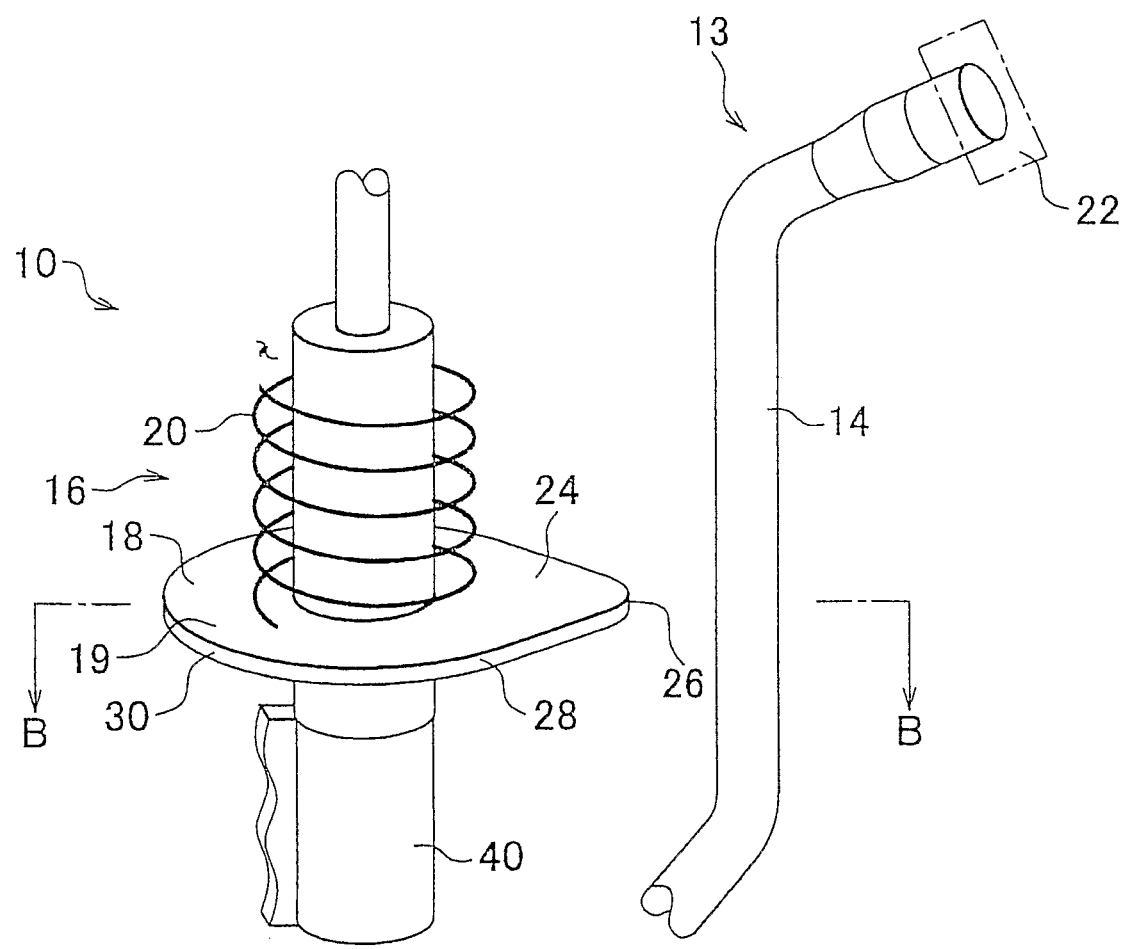
FIG. 1 is a schematic diagram illustrating a main portion of a vehicle to which the invention is applied.

The best mode for carrying out the invention will hereinafter be described in detail with reference to the drawings;

FIG. 1 is a schematic diagram illustrating a main portion of a vehicle 10 to which the invention is applied. In the vehicle 10 shown in the drawing, a fuel inlet 13 and a shock absorber 16 are both surrounded by vehicle structural bodies such as a wheel house and a bracket and the like, both not shown, at a vehicle rear portion.

The fuel inlet 13 includes a fuel inlet pipe 14 and a fuel filler hole 22. The fuel filler hole 22 is structured such that fuel necessary for the vehicle 10 to run can be filled from the outside. The fuel inlet pipe 14 connects the fuel filler hole 22 to a fuel tank, not shown, so as to be able to introduce fuel filled from the fuel filler hole 22 to the fuel tank The shock absorber 16 includes a coil spring 20, a spring seat 18, and an absorber portion 40. An upper end of the coil spring 20 is fixed to a spring upper end fixing portion, not shown, and a lower end of the coil spring 20 is fixed to a seat portion 19 of the spring seat 18. The spring seat 18 in this example embodiment is formed fixed to a center portion of the shock absorber 16 and extending in a disc shape from the inside to the outside.

Figure 2A:
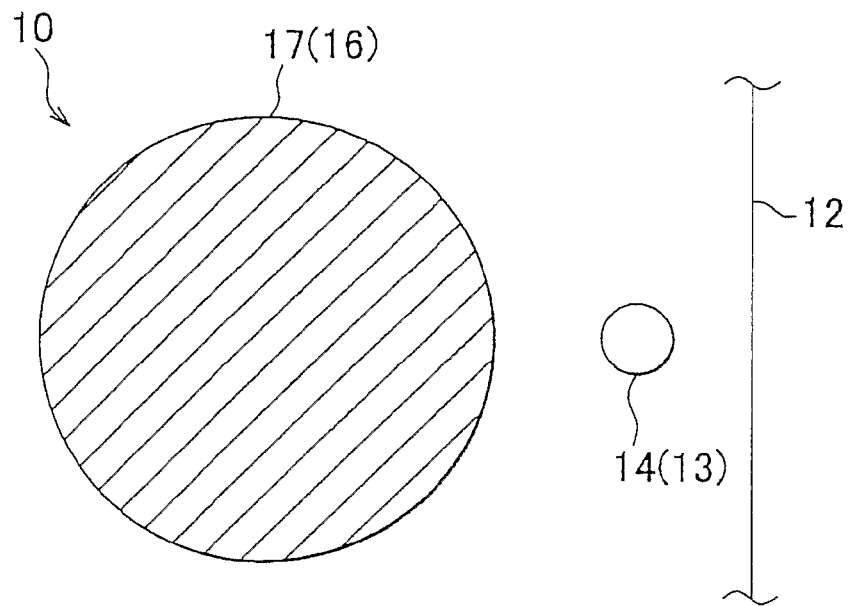
FIG. 2 is a view showing the structure of a cross-section of a related spring seat

Here, a spring seat 17 of related art is basically formed in a perfectly circular shape. FIG. 2A is a view showing the structure of a cross-section of the spring seat 17 of the shock absorber 16. The fuel inlet pipe 14 is arranged in close proximity to the shock absorber 16. The shock absorber 16 and the fuel inlet pipe 14 are both arranged toward the rear of the vehicle 10 and surrounded by a vehicle structural body 12 such as a wheel house and a bracket and the like. For the sake of convenience, only a portion of the vehicle structural body 12 is shown in FIG. 2.

Figure 2B:
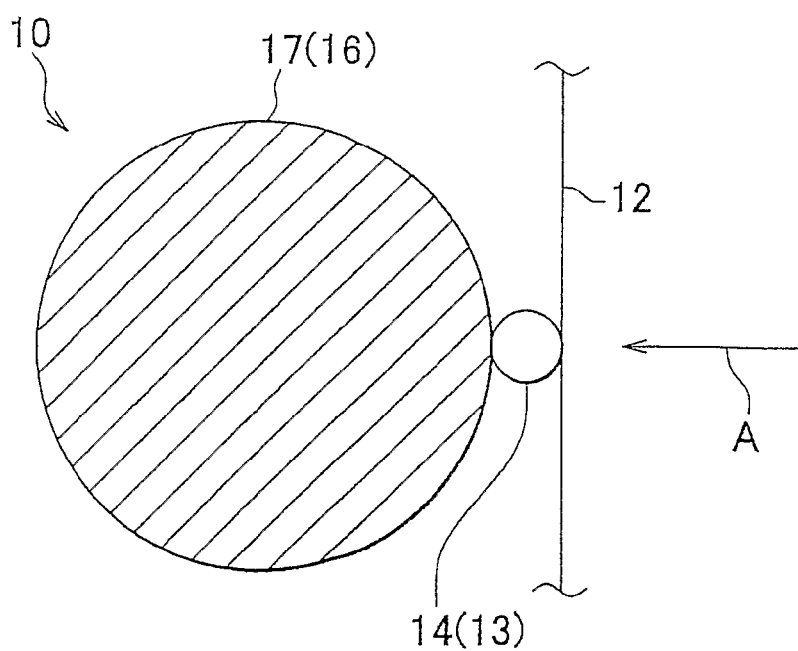

In this case, if the vehicle 10 is hit (i.e., collided with) from behind, the fuel inlet pipe 14 and the spring scat 18 may interfere with each other. FIG. 2B is a sectional view schematically showing the area around the shock absorber 16 when the vehicle 10 has been hit from behind. As is shown by arrow A in FIG. 2B, the vehicle structural body 12 is forced close to the shock absorber 16 by the collision from behind. As a result, the fuel inlet pipe 14 may become sandwiched between the spring seat 18 and the vehicle structural body 12 because the spring seat 18 is a member having the largest diameter in the lengthwise direction of the shock absorber 16 (i.e., in the direction perpendicular to the paper on which FIG. 2 is drawn). In this case, in order to suppress a possibly adverse effect on the fuel inlet pipe 14, the related art increased the durability of the fuel inlet pipe 14. However, this approach increases the cost of the fuel inlet pipe 14, which in turn increases the cost of the vehicle 10.

In consideration of this problem, the spring seat 18 in this example embodiment is structured to include a seat portion 19 and a slide portion 24. The seat portion 19 is formed in a disc shape and fixed to the lower end of the coil spring 20, as described above. The slide portion 24 is formed protruding in the radial direction from the seat portion 19 toward the outside. In this example embodiment, the seat portion 19 and the slide portion 24 are integrally formed as a flat disc-shaped member.

Next, the shape of the spring seat 18 will be described in further detail with reference to FIG. 3A which is a sectional view taken along line B-B in FIG. 1. Further, in FIGS. 3A and 3B, the arrow "IN" points toward the inside in the width direction of the vehicle 10 and the arrow "RR" points toward the rear in the longitudinal direction of the vehicle 10.

Figure 3A:
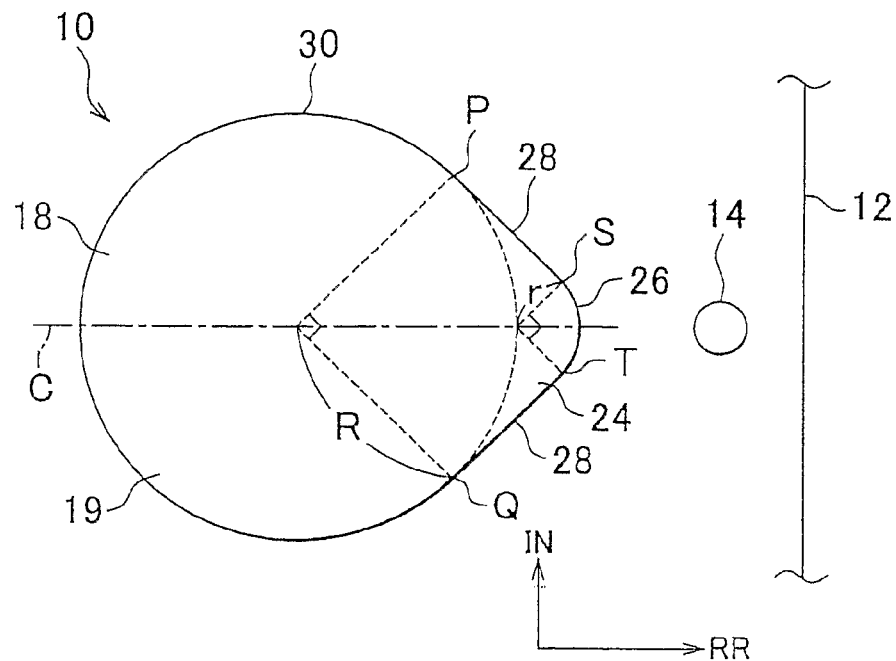
FIG. 3 is a view showing the structure of a cross-section of a spring seat according to the invention.

The sectional shape of the spring seat 18 is axisymmetrical with respect to a center axis C shown by the alternate long and short dash line in FIG. 3A. The cross section of the seat portion 19 is arc shaped with a radius R. In this example embodiment, the fuel inlet pipe 14 is arranged between the shock absorber 16 and the vehicle structural body 12.

The side surface of the slide portion 24 includes a tip end surface 26 and a slide surface 28. The tip end surface 26 is a flat rounded surface with a radius r in this example embodiment. The radius r is smaller than the radius R of the seat portion 19. Therefore, the curvature of the tip end surface 26 is larger than the curvature of the seat portion 19. The slide surface 28 is formed on both sides of the tip end surface 26, sandwiching the center axis C. The slide surface 28 is a flat surface that smoothly connects the flat rounded tip end surface 26 with a flat rounded side surface 30 of the seat portion 19. That is, the slide surface 28 is a connecting flat surface which is connected to the flat rounded tip end surface 26 and the flat rounded side surface 30 of the seat portion 19. In this way, the side surface of the spring seat 18 is smooth, with no sharp portions, all around the entire circumference. In this example embodiment, the center angle of arc PQ between connecting seams P and Q between the side surface 30 and both slide surfaces 28 is 90 degrees, for example. As a result, the center angle of arc ST between connecting seams S and T between the tip end surface 26 and both slide surfaces 28 is also 90 degrees. The center angle of the arc PQ is not limited to 90 degrees but may be set appropriately as necessary for the design.

Figure 3B:
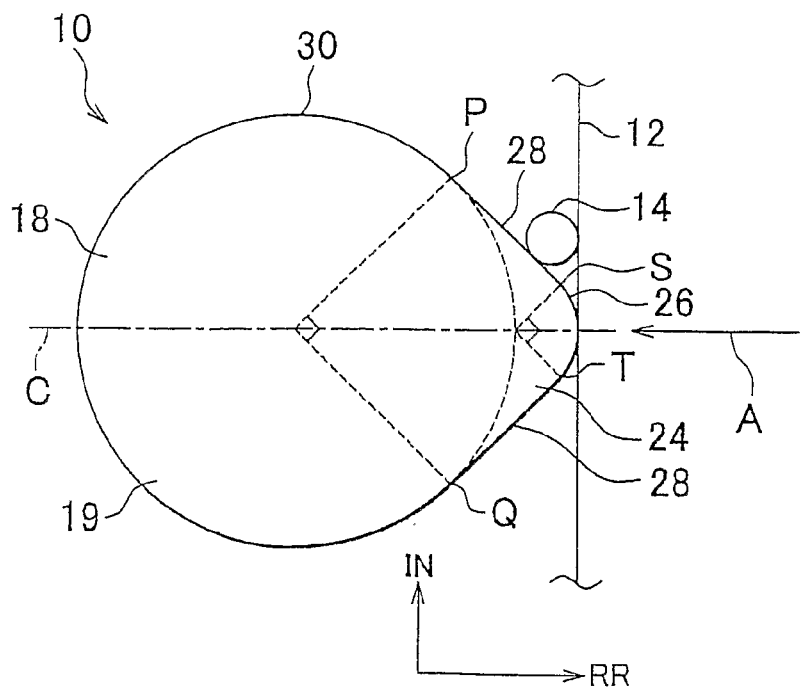

FIG. 3B is a sectional view of the area around the shock absorber 16 of this example embodiment when the vehicle 10 has been hit from behind. As shown by arrow A in FIG. 3B, the vehicle structural body 12 is forced close to the shock absorber 16 by the collision from behind. As a result, the fuel inlet pipe 14 contacts the tip end surface 26 and is guided to one of the two slide surfaces 28 that are on the sides, depending on the location of contact. The fuel inlet pipe 14 then slides along the slide surface 28 toward the side surface of the seat portion 19. In this example embodiment, the slide surface 28 is a flat surface so the fuel inlet pipe 14 can slide smoothly from the tip end surface 26 side to the seat portion 19 side.

In the example embodiment described above, even if the vehicle 10 is hit-from behind and the vehicle structural body 12 is forced close to the shock absorber 16 as a result, the fuel inlet pipe 14 that is arranged between the vehicle structural body 12 and the shock absorber 16 can slide along the slide portion 24. Accordingly, interference between the fuel inlet pipe 14 and the shock absorber 16 can be relieved at a low cost by a simple structure in which the slide portion 24 is provided.

In particular, the slide surface 28 is formed on both sides of the flat rounded tip end surface 26. As a result, even if the fuel inlet pipe 14 contacts the tip end surface 26 during a collision, regardless of the direction from which the fuel inlet pipe 14 approaches the tip end surface 26, the fuel inlet pipe 14 is able to slide along one of the slide surfaces 28 that are on the sides. As a result, the adverse effect from interference between the fuel inlet pipe 14 and the shock absorber 16 can be reduced to an even greater extent.

In this example embodiment, the side surface 30 of the seat portion 19 and the tip end surface 26 of the slide portion 24 have flat rounded shapes and the slide surface 28 is a flat surface that connects these. The invention is not limited to this structure, however. For example, the tip end surface 26 may also be a convex shaped curved surface other than a flat rounded surface, which guides the fuel inlet pipe 14 to the slide surface 28. The slide surface 28 may also have either a convex shape or a concave shape to enable the fuel inlet pipe 14 to slide toward the seat portion 19.

Figure 4A:
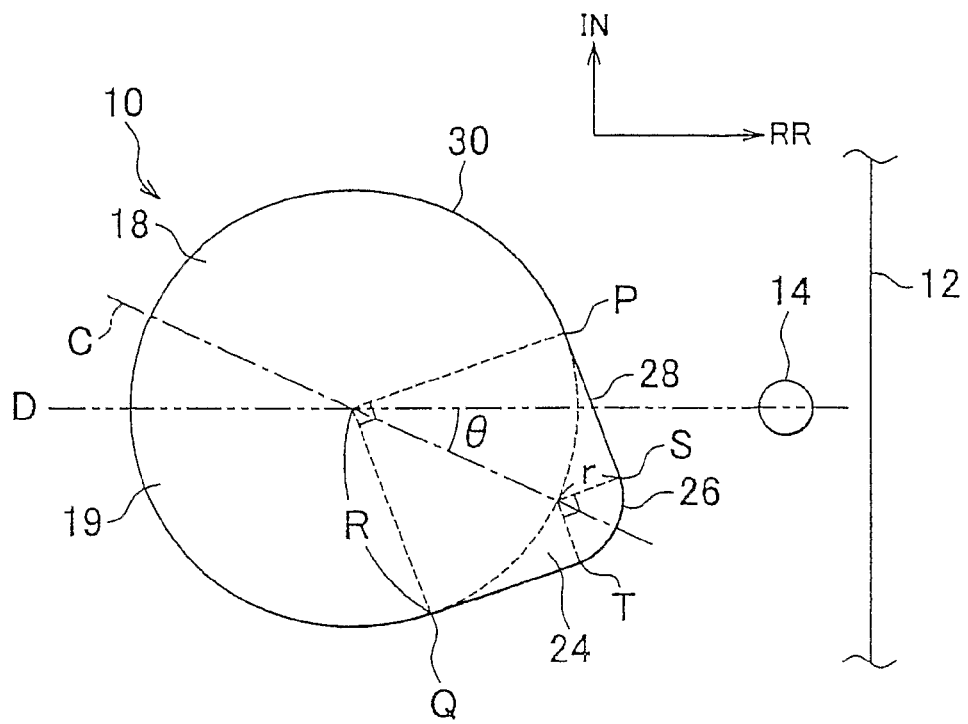
FIG. 4A and FIG. 4B are views showing the sectional structure of a spring seat according to a second example embodiment of the invention.

FIG. 4A is a view showing the sectional structure of a spring seat according to a second example embodiment of the invention. As shown in the drawing, the fuel inlet pipe 14 is arranged behind the shock absorber 16 in the longitudinal direction of the vehicle. The spring seat 18 of the shock absorber 16 has a slide portion 24 that protrudes toward the rear from the seat portion 19 in the longitudinal direction of the vehicle 10. The slide surface 28 of the slide portion 24 is provided on line D which connects the axial center of the shock absorber 16 with the axial center of the fuel inlet pipe 14. The tip end surface 26 in this example embodiment differs from the tip end surface 26 in the first example embodiment of the invention in that it is provided at a predetermined angle θ with respect to line D which connects the axial center of the shock absorber 16 with the axial center of the fuel inlet pipe 14. Further, in FIGS. 4A and 4B, the arrow "IN" points toward the inside in the width direction of the vehicle 10 and the arrow "RR" points toward the rear in the longitudinal direction of the vehicle 10.

Figure 4B:
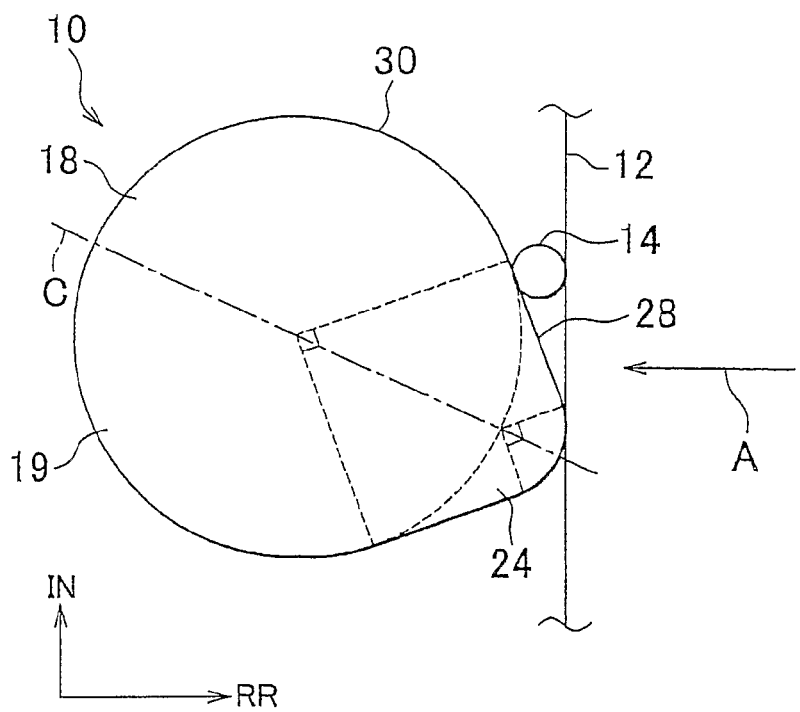

FIG. 4B is a sectional view of the area around the shock absorber 16 of this example embodiment when the vehicle 10 has been hit from behind. The, vehicle structural body 12 is forced close to the shock absorber 16 when the vehicle 10 is hit, as shown by arrow A in FIG. 4B. As a result, the fuel inlet pipe 14 contacts the slide surface 28 and slides along this slide surface 28 toward the side surface of the seat portion 19.

In the second example embodiment as well, the effect from interference between the fuel inlet pipe 14 and the shock absorber 16 can be reduced just as it is in the first example embodiment of the invention. Also, in the first example embodiment, the distance between the axial center of the shock absorber 16 and the fuel inlet pipe 14 when the vehicle 10 has not been hit is set to a predetermined distance at which the tip end surface 26 and the fuel inlet pipe 14 will not interfere with each other. Because the tip end surface 26 according to this example embodiment is provided at a predetermined angle θ with respect to line D which connects the axial center of the shock absorber 16 with the axial center of the fuel inlet pipe 14, however, the distance between the axial center of the shock absorber 16 and the fuel inlet pipe 14 can be shorter than it is in the first example embodiment.

Figure 5:
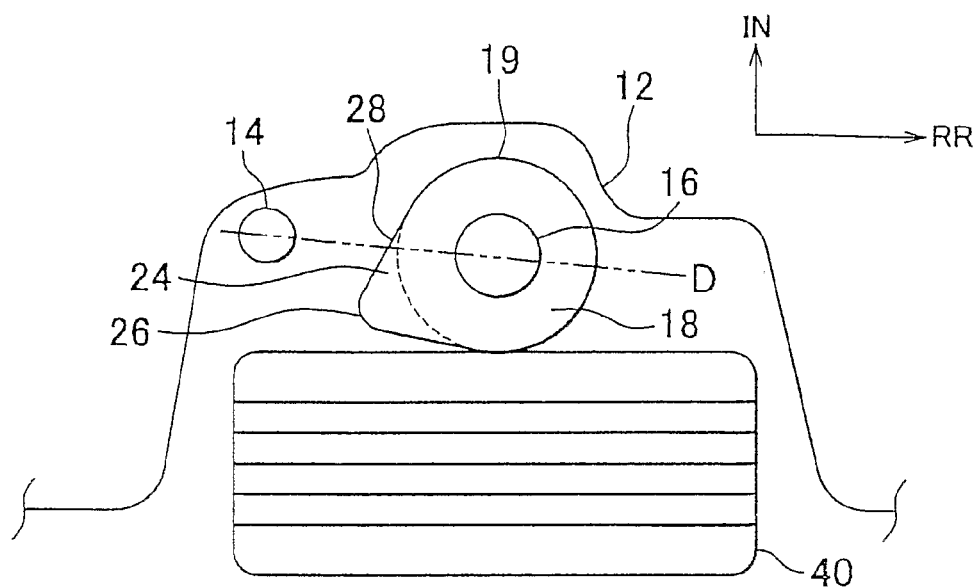
FIG. 5 is a schematic view showing a main portion of a vehicle to which a spring seat according to a modified example of the second example embodiment of the invention has been applied.

Also, in the foregoing second example embodiment, the slide portion 24 is provided protruding toward the rear from the seat portion 19 in the longitudinal direction of the vehicle 10. Alternatively, however, when the fuel inlet pipe 14 is arranged in front of the shock absorber 16 in the longitudinal direction of the vehicle 10, as shown in FIG. 5, the rear tire 40 may be provided to the outside of the seat portion 19 in the width direction of the vehicle 10, the slide portion 24 may be provided protruding toward the front in the longitudinal direction of the vehicle 10 where the fuel inlet pipe 14 is arranged, and the slide surface 28 of the slide portion 24 may be provided on line D which connects the axial center of the shock absorber 16 with the axial center of the fuel inlet pipe 14. With this structure as well, when the vehicle 10 is hit from behind such that the shock absorber 16 is forced close to the fuel inlet pipe 14, and as a result, there is interference between the shock absorber 16 and the fuel inlet pipe 14, the fuel inlet pipe 14 contacts the slide surface 28 of the seat portion 19 and slides along that slide surface 28 toward the side surface of the seat portion 19. As a result, effects from interference between the fuel inlet pipe 14 and the shock absorber 16 can be reduced. Further, the distance between the axial center of the shock absorber 16 and the fuel inlet pipe 14 can be shorter than it is in the first example embodiment, similar to the second example embodiment. Also, in FIG. 5, the arrow "IN" points toward the inside in the width direction of the vehicle 10 and the arrow "RR" points toward the rear in the longitudinal direction of the vehicle 10.

Figure 6:
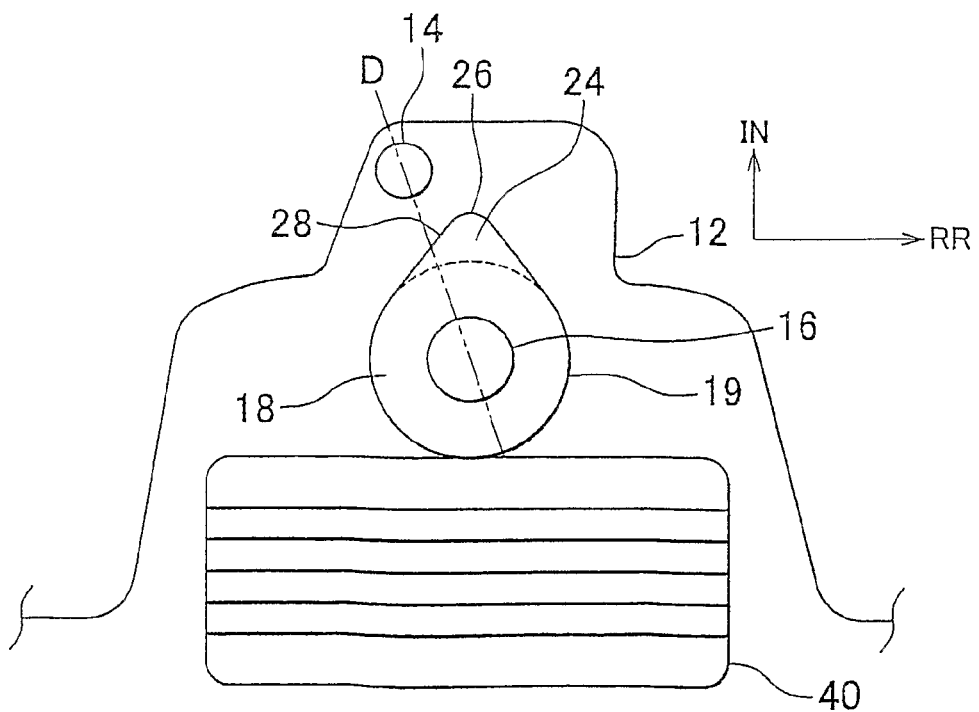
FIG. 6 is a schematic view showing a main portion of a vehicle to which a spring seat according to a third example embodiment of the invention has been applied.

FIG. 6 is a schematic view showing the sectional structure of a main portion of a vehicle to which a spring seat according to a third example embodiment of the invention has been applied. As shown in the drawing, the fuel inlet pipe 14 is arranged near and to the inside of the shock absorber 16 in the width direction of the vehicle 10. The spring seat 18 of the shock absorber 16 includes a slide portion 24 that protrudes toward the inside in the vehicle width direction from the seat portion. A slide surface 28 of the slide portion 24 is provided on line D which connects the axial center of the shock absorber 16 with the axial center of the fuel inlet pipe 14. Also, in FIG. 6, the arrow "IN" points toward the inside in the width direction of the vehicle 10 and the arrow "RR" points toward the rear in the longitudinal direction of the vehicle 10.

According to the third example embodiment, when the vehicle 10 is hit from the outside in the width direction of the vehicle 10 such that the shock absorber 16 is forced close to the fuel inlet pipe 14, and as a result, there is interference between the shock absorber 16 and the fuel inlet pipe 14, the fuel inlet pipe 14 contacts the slide surface 28 and slides along that slide surface 28 toward the side surface of the seat portion 19. As a result, effects from interference between the fuel inlet pipe 14 and the shock absorber 16 can be reduced, just as in the second example embodiment of the invention. In particular, the spring seat 18 according to this example embodiment is effective against an impact from the side in the width direction of the vehicle 10.

FIGS. 5 and 6 have been described based on technology in which a slide surface 28 of a slide portion 24 is provided on line D which connects the axial center of the shock absorber 16 with the fuel inlet pipe 14. The invention is not limited to this structure, however. For example, the tip end surface 26 may also be provided on line D which connects the axial center of the shock absorber 16 with the fuel inlet pipe 14. This kind of structure is also able to achieve the same effects as those achieved with the first example embodiment.

The invention claimed is:

1. A shock absorber spring seat mounted in a vehicle provided with a shock absorber and a fuel inlet pipe arranged near the shock absorber, comprising:
   a disc-shaped seat portion to which one end of a coil spring is fixed; and
   a slide portion formed protruding in a radial direction from the seat portion, wherein the slide portion includes a tip end surface and a slide surface formed on both sides of the tip end surface, wherein
   a first radius of curvature of the tip end surface is smaller than a second radius of curvature of the seat portion,
   wherein the slide portion is provided on a line that connects an axial center of the shock absorber with the fuel inlet pipe and the slide portion is disposed between the axial center of the shock absorber and the fuel inlet pipe on said line.

2. The shock absorber spring seat according to claim 1, wherein the fuel inlet pipe is provided to a rear of the shock absorber in a longitudinal direction of the vehicle.

3. The shock absorber spring seat according to claim 2, wherein the slide portion has a slide surface, wherein the slide surface is provided on a line that connects the axial center of the shock absorber with the fuel inlet pipe.

4. The shock absorber spring seat according to claim 2, wherein:
   the slide portion has a flat curved tip end surface; and
   the tip end surface is provided on a line that connects the axial center of the shock absorber with the fuel inlet pipe.

5. The shock absorber spring seat according to claim 1, wherein the fuel inlet pipe is provided in front of a shock absorber in a longitudinal direction of the vehicle.

6. The shock absorber spring seat according to claim 1, wherein the fuel inlet pipe is provided to the inside of a shock absorber in a width direction of the vehicle.

7. The shock absorber spring seat according to claim 1, wherein the line that connects an axial center of the shock absorber with the fuel inlet pipe intersects the slide portion at a radial center of the tip end surface.

* * * * *